US012471791B2

(12) United States Patent
Aumer et al.

(10) Patent No.: US 12,471,791 B2
(45) Date of Patent: Nov. 18, 2025

(54) OPTICAL SENSOR MODULES WITH SELECTIVE OPTICAL PATHWAYS

(71) Applicant: YUKKA MAGIC LLC, Wilmington, DE (US)

(72) Inventors: Michael Edward Aumer, Raleigh, NC (US); Jonathan T. Walter, Wake Forest, NC (US); Steven Francis LeBoeuf, Raleigh, NC (US)

(73) Assignee: Yukka Magic LLC, Wilmington, DE (US)

( * ) Notice: Subject to any disclaimer, the term of this patent is extended or adjusted under 35 U.S.C. 154(b) by 482 days.

(21) Appl. No.: 17/434,854

(22) PCT Filed: Feb. 28, 2020

(86) PCT No.: PCT/US2020/020350
§ 371 (c)(1),
(2) Date: Aug. 30, 2021

(87) PCT Pub. No.: WO2022/180668
PCT Pub. Date: Sep. 10, 2022

(65) Prior Publication Data
US 2022/0142494 A1 May 12, 2022

Related U.S. Application Data

(60) Provisional application No. 62/812,669, filed on Mar. 1, 2019.

(51) Int. Cl.
*A61B 5/024* (2006.01)
(52) U.S. Cl.
CPC ............................... *A61B 5/02427* (2013.01)

(58) Field of Classification Search
CPC ............ A61B 5/02427; A61B 2560/04; A61B 2562/0233; A61B 5/6802; A61B 5/02416
See application file for complete search history.

(56) References Cited

U.S. PATENT DOCUMENTS 4,880,304 A * 11/1989 Jaeb .................... G01N 21/3151
356/41
5,539,513 A 7/1996 Dunne
(Continued)

OTHER PUBLICATIONS

"International Search Report and Written Opinion of the International Searching Authority", PCT Application No. PCT/US2020/020350, Jun. 1, 2020, 9 pp.
(Continued)

*Primary Examiner* — Oommen Jacob
(74) *Attorney, Agent, or Firm* — Brownstein Hyatt Farber Schreck, LLP

(57) ABSTRACT

An optical sensor module includes a housing, first and second optical emitters within the housing, and an optical detector within the housing that is positioned between the first and second optical emitters. The housing includes respective first and second windows of optically transparent material that overlie the first and second optical emitters, and also includes a third window of optically transparent material that overlies the optical detector. The third window includes opposite first and second ends and opposite first and second sides, and at least one of the first and second sides is curved inwardly. Both of the first and second sides of the third window may be curved inwardly such that the third window has an hourglass shape.

12 Claims, 7 Drawing Sheets

(56) References Cited

U.S. PATENT DOCUMENTS

| | | | | |
|---|---|---|---|---|
| 5,584,296 | A * | 12/1996 | Cui | A61B 5/14553 356/41 |
| 6,088,607 | A * | 7/2000 | Diab | A61B 5/02427 600/323 |
| 8,649,839 | B2 * | 2/2014 | Chin | A61B 5/14552 600/324 |
| 9,794,653 | B2 | 10/2017 | Aumer et al. | |
| 11,119,608 | B2 * | 9/2021 | Chung | G06F 1/1626 |
| 11,331,014 | B2 * | 5/2022 | Wawro | A61B 5/14552 |
| 2003/0080941 | A1 * | 5/2003 | Schkolnik | G06F 3/0312 345/163 |
| 2003/0109775 | A1 * | 6/2003 | O'Neil | A61B 5/6841 600/323 |
| 2004/0224237 | A1 * | 11/2004 | Lin | G03F 1/72 702/155 |
| 2007/0120049 | A1 * | 5/2007 | Wong | G01D 5/34707 250/231.13 |
| 2010/0010326 | A1 * | 1/2010 | Dalvi | A61B 5/6826 600/322 |
| 2010/0217102 | A1 * | 8/2010 | LeBoeuf | A61B 5/7282 600/310 |
| 2011/0133941 | A1 * | 6/2011 | Yao | H03K 17/945 250/221 |
| 2012/0197093 | A1 * | 8/2012 | LeBoeuf | A61B 5/7203 250/226 |
| 2014/0107493 | A1 * | 4/2014 | Yuen | A61B 5/7455 600/479 |
| 2014/0361147 | A1 * | 12/2014 | Fei | G01J 1/0407 250/206 |
| 2015/0126831 | A1 * | 5/2015 | Sandmore | A61B 5/02427 600/323 |
| 2016/0058312 | A1 * | 3/2016 | Han | G01N 21/55 600/479 |
| 2017/0164848 | A1 * | 6/2017 | Nadeau | A61B 5/14552 |
| 2017/0325698 | A1 * | 11/2017 | Allec | A61B 5/14552 |
| 2018/0092601 | A1 | 4/2018 | Wagner et al. | |
| 2019/0090766 | A1 * | 3/2019 | Block | A61B 5/02433 |
| 2022/0142494 | A1 * | 5/2022 | Aumer | A61B 5/6802 |

OTHER PUBLICATIONS

International Search Report and Written Opinion mailed Sep. 16, 2022 in corresponding PCT application PCT/US2020/020350.

* cited by examiner

| Subject | T (Fig. 1A) | HW (Fig. 3A) |
|---|---|---|
| S1 | | |
| S2 | | |
| S3 | | |
| S4 | | |
| S5 | | |
| S6 | | |
| S7 | | |
| S8 | | |
| S9 | | |
| S10 | | |
| S11 | | |
| S12 | | |
| S13 | | |
| S14 | | |
| S15 | | |
| S16 | | |
| S17 | | |
| S18 | | |
| S19 | | |
| S20 | | |
| S21 | | |
| S22 | | |
| S23 | | |
| S24 | | |
| Pass/Fail (%) | 14/24 (58%) | 21/24 (88%) |

FIG. 8A

| Subject | T (Fig. 1A) | HW (Fig. 3A) |
|---|---|---|
| S1 | 42 | 44 |
| S3 | 14 | 22 |
| S6 | 60 | 48 |
| S7 | 17 | 32 |
| S8 | 25 | 28 |
| S9 | 17 | 16 |
| S10 | 59 | 42 |
| S11 | 11 | 31 |
| S12 | 24 | 51 |
| S14 | 17 | 17 |
| S16 | 10 | 37 |
| S17 | 101 | 94 |
| S20 | 33 | 34 |
| Median FOM | 24 | 34 |
| Average FOM | 33.1 | 38.2 |

OPTICAL SENSOR MODULES WITH SELECTIVE OPTICAL PATHWAYS

RELATED APPLICATIONS

This application is a 35 U.S.C. § 371 national stage application of PCT Application No. PCT/US2020/020350, filed on Feb. 28, 2020, which claims the benefit of and priority to U.S. Provisional Patent Application No. 62/812,669 filed Mar. 1, 2019, the disclosures of which are incorporated herein by reference as if set forth in their entireties. The above-referenced PCT International Application was published in the English language as International Publication No. WO 2020/180668 A1 on Sep. 10, 2020.

FIELD OF THE INVENTION

The present invention relates generally to wearable devices, and more particularly to wearable optical sensor modules.

BACKGROUND OF THE INVENTION

An optical pathway is a physical path traveled by a beam of light that is comprised of a plurality of photons. For noninvasive photoplethysmography (PPG) monitoring, an optical pathway may include a pathway through tissue and blood, wherein tissue may include skin, muscle, tendons, bone, cartilage, blood vessels, and the like, and wherein blood may include pulsatile blood, pooled blood, and the like. In PPG monitoring, as blood flow modulates (pulsates) in time, the resulting modulating photon density collected by an optical detector of a PPG sensor generates an electrical signal in the detection electronics that modulates in unison with the changing photon density (an "AC" PPG signal), which in turn modulates with the pulsating blood flow. In addition to the modulating photon density, a high portion of the photon density does not modulate with blood flow, creating a "DC" PPG signal. There is a higher percentage of AC-to-DC (AC/DC) signal in optical pathways that have a higher percentage of modulating (pulsatile) blood flow. Also, there is a lower percentage of AC-to-DC signal in optical pathways that have a lower percentage of modulating blood flow.

Conventional PPG sensors collect light scattered through multiple optical pathways in physiological material (i.e., skin, body tissue, pulsating blood, pooled blood, and the like), and some of those pathways are extremely noisy during body motion. Unfortunately, these conventional PPG sensors are configured to collect as much light as possible, rather than to collect light from optical pathways having the highest ratio of pulsatile blood flow signal in comparison to the overall optical signal. This, unfortunately, leads to more optical noise collected.

Ideally for PPG monitoring, light detected by the optical detector(s) comes from an optical pathway that has interacted with a high ratio of pulsatile blood flow (such as with capillaries and arterioles) in comparison to other physiological material (such as skin, venous blood, and various tissues). However, optical pathways that have interacted with the highest percentage of pulsatile blood flow may also have the lowest number of photons escaping the physiological material and entering the optical detector. If the photons collected are too few, the overall PPG signal may be below the noise floor (such as the quantization noise floor, or the like) of the optical detection electronics. In such case, all the right photons are collected, but there are too few photons to generate a meaningful modulating electrical signal that resembles the modulating photon density. As such, there is a need for collecting as many of the photons as possible from optical pathways that have interacted with the highest percentage of pulsatile blood.

Exemplary PPG sensor modules 10, 20 that are configured to be worn against the skin of an animal or person, are illustrated in FIGS. 1A-1B. The illustrated PPG sensor modules 10, 20 include a housing 11 that encloses optical emitters 12 and an optical detector 14. FIGS. 1A-1B illustrate a traditional PPG sensor module structure wherein two optical emitters 12 are positioned on each side of an optical detector 14. In FIG. 1A, the size of the windows 12w, 14w in the housing 11 that expose the optical emitters 12 and the optical detector 14 are relatively similar. In FIG. 1B, the size of the window 14w in the housing 11 that exposes the optical detector 14 is much wider (i.e., is elongated) in one direction than the windows 12w exposing the optical emitters 12. A benefit of the elongated configuration of window 14w is that the window allows more photons from optical pathways that have traveled through a higher percentage of pulsatile physiological material to reach the optical detector 14. For example, as shown in FIG. 2A, the optical detector configuration of FIG. 1A would not be able to collect light from optical pathways that have traveled across a greater length of pulsatile blood flow. This is represented by the top and bottom arrows A1, A3 in FIG. 2A. Only optical pathways of shorter length, represented by arrow A2, can be collected by the optical detector 14 because of the small size and configuration of the window 14w in FIG. 2A.

In contrast, as shown in FIG. 2B, the optical detector 14 is able to collect light from longer pathways because of the larger size of the window 14w. However, the optical detector window 14w configuration of FIGS. 1B and 2B shares the same weakness as the configuration of FIG. 1A. The shorter optical pathways, which have not interacted with a high percentage of pulsatile blood flow (and which are less desirable), are also allowed to reach the optical detector 14. This is illustrated by the arrows A2 in FIGS. 2A-2B. Additionally, the larger window 14w of FIGS. 1B-2B will allow more ambient light to reach the optical detector 14 than the window 14w of FIGS. 1A-2A. Such ambient light may generate noise in the collected optical signal.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the invention.

According to some embodiments of the present invention, an optical sensor module includes a housing, first and second optical emitters within the housing, and an optical detector within the housing that is positioned between the first and second optical emitters. The housing includes respective first and second windows of optically transparent material that overlie the first and second optical emitters, and also includes a third window of optically transparent material that overlies the optical detector. The third window includes opposite first and second ends and opposite first and second sides, and at least one of the first and second sides is curved inwardly. In some embodiments, both of the first and second sides of the third window are curved inwardly. In some embodiments, both of the first and second sides of the third window are curved inwardly such that the third window has an hourglass shape. In some embodiments, light guiding material may be located adjacent at least one of the first and second ends of the third window. In some embodiments, the optical sensor module is a PPG sensor module.

According to other embodiments of the present invention, an optical sensor module includes a housing, first and second optical emitters within the housing, and an optical detector within the housing that is positioned between the first and second optical emitters. The housing comprises respective first and second windows of optically transparent material overlying the first and second optical emitters, and a third window of optically transparent material overlying the optical detector. The third window has an elongated rectangular shape with opposite first and second ends and opposite first and second sides. An opaque material is deposited on portions of the third window such that the optically transparent portion of the third window has an hourglass shape. In some embodiments, the opaque material may include paint, plastic, metal, carbon, or glass. In some embodiments, the opaque material has a greater opacity adjacent the first and second sides of the third window, and the opacity of the opaque material decreases in a direction towards the center of the third window. In other words, the opacity of the opaque material is greatest adjacent the first and second sides of the third window and decreases inwardly towards the center of the third window. In some embodiments, light guiding material is located adjacent at least one of the first and second ends of the third window. In some embodiments, the optical sensor module is a PPG sensor module.

According to other embodiments of the present invention, an optical sensor module includes a housing, first and second optical emitters within the housing, and an optical detector within the housing that is positioned between the first and second optical emitters. The housing includes respective first and second windows of optically transparent material overlying the first and second optical emitters, and a third window of optically transparent material overlying the optical detector. The third window has an elongated rectangular shape with opposite first and second ends and opposite first and second sides. An opaque material overlies a portion of the third window adjacent one of the first and second sides such that the one of the first and second sides of the third window effectively curves inwardly towards the center of the third window. In some embodiments, the opaque material includes paint, plastic, metal, carbon, or glass. In some embodiments, the opaque material has a greater opacity adjacent the one of the first and second sides of the third window and the opacity decreases inwardly towards the center of the third window. In other words, the opacity of the opaque material is greatest adjacent the respective side of the third window and decreases inwardly towards the center of the third window. In some embodiments, light guiding material is located adjacent at least one of the first and second ends of the third window. In some embodiments, the optical sensor module is a PPG sensor module.

According to other embodiments of the present invention, an optical sensor module includes a housing, an optical emitter within the housing, and a plurality of optical detectors within the housing that are positioned radially outwardly from the optical emitter. The housing includes a first window of optically transparent material overlying the optical emitter, and a respective plurality of arcuate windows of optically transparent, each arcuate window overlying a respective one of the optical detectors. The plurality of arcuate windows are positioned around the first window in an end-to-end relationship, and each of the arcuate windows has a side adjacent the first window that is curved outwardly away from the first window. In some embodiments, there are four arcuate windows, although other numbers are possible. In some embodiments, the optical sensor module is a PPG sensor module.

Embodiments of the present invention allow optical sensors to accept light from the most desirable pathways and reject light from the least desirable pathways. Thus, embodiments of the present invention help by taming external light contamination and undesirable optical pathways while simultaneously accepting light from the most desirable optical pathways.

It is noted that aspects of the invention described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail below.

BRIEF DESCRIPTION OF THE DRAWINGS

The accompanying drawings, which form a part of the specification, illustrate various embodiments of the present invention. The drawings and description together serve to fully explain embodiments of the present invention.

FIGS. 8A-8B are tables that summarize PPG data collected from the sensor in FIG. 1A and the sensor in FIGS. 3A-3B during a standard exercise testing protocol, comprising resting and exercising periods.

FIG. 9A is a perspective view of a PPG sensor module according to embodiments of the present invention and illustrating windows in the housing of the sensor module that expose the optical emitters and a window in the housing that exposes the optical detector.

DETAILED DESCRIPTION

Figure 1A:
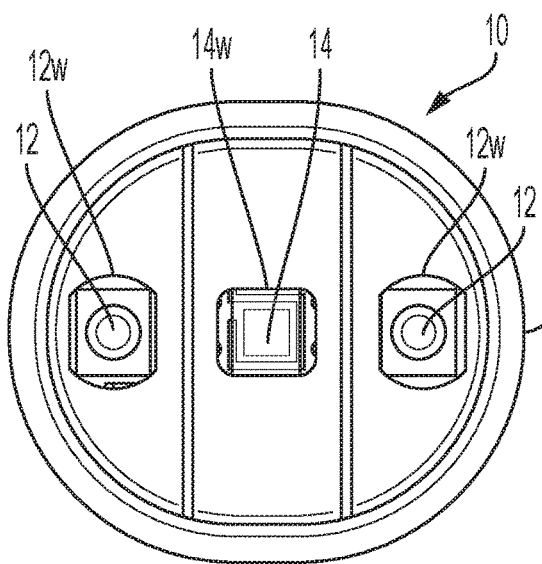
FIGS. 1A-1B and 2A-2B are plan views of conventional PPG sensor modules illustrating respective windows in the housing of the sensor module that expose optical emitters and an optical detector located within the housing.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the figures and/or claims unless specifically indicated otherwise. Features described with respect to one figure or embodiment can be associated with another embodiment or figure although not specifically described or shown as such.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached", "coupled", or "secured" to another feature or element, it can be directly connected, attached, coupled, or secured to the other feature or element or intervening features or elements may be present. In contrast, when a feature or element is referred to as being "directly connected", "directly attached", "directly coupled", or "directly secured" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting of the invention. As used herein, the singular forms "a", "an" and "the" are intended to include the plural forms as well, unless the context clearly indicates otherwise.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

As used herein, the term "and/or" includes any and all combinations of one or more of the associated listed items and may be abbreviated as "/".

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

It will be understood that although the terms first and second are used herein to describe various features or elements, these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The term "about", as used herein with respect to a value or number, means that the value or number can vary, for example, by as much as +/−20%.

The terms "optical source" and "optical emitter", as used herein, are interchangeable.

The term "monitoring" refers to the act of measuring, quantifying, qualifying, estimating, sensing, calculating, interpolating, extrapolating, inferring, deducing, or any combination of these actions. More generally, "monitoring" refers to a way of getting information via one or more sensing elements. For example, "blood health monitoring" may include monitoring blood gas levels, blood hydration, and metabolite/electrolyte levels, etc.

The term "physiological" refers to matter or energy of or from the body of a creature (e.g., humans, animals, etc.). In embodiments of the present invention, the term "physiological" is intended to be used broadly, covering both physical and psychological matter and energy of or from the body of a creature. However, in some cases, the term "psychological" is called-out separately to emphasize aspects of physiology that are more closely tied to conscious or subconscious brain activity rather than the activity of other organs, tissues, or cells.

The term "body" refers to the body of a subject (human or animal) that may wear a device according to embodiments of the present invention.

The term "coupling", as used herein, refers to the interaction or communication between excitation energy entering a region of a body and the region itself. For example, one form of optical coupling may be the interaction between excitation light generated from an optical emitter and the blood vessels of the body of a user. This interaction may involve excitation light entering the ear region or other body regions and scattering from a blood vessel in the ear or other part of the body such that the intensity of scattered light is proportional to blood flow within the blood vessel.

Figure 3A:
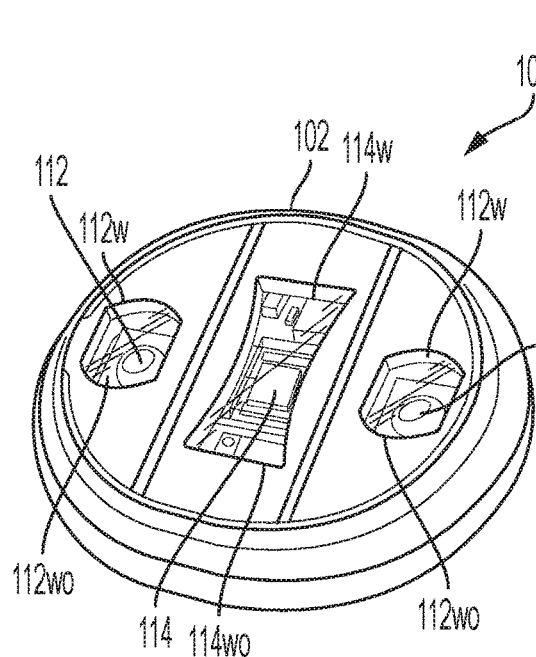
FIG. 3A is a perspective view of a PPG sensor module according to embodiments of the present invention and illustrating windows in the housing of the sensor module that expose the optical emitters and a window in the housing that exposes the optical detector.
Figure 3B:
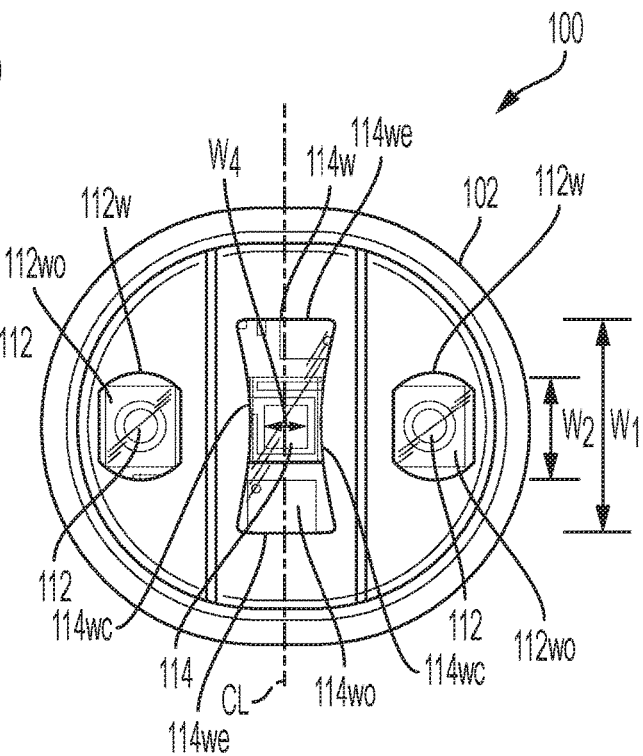
FIG. 3B is a plan view of the PPG sensor module of FIG. 3A.
Figure 4A:
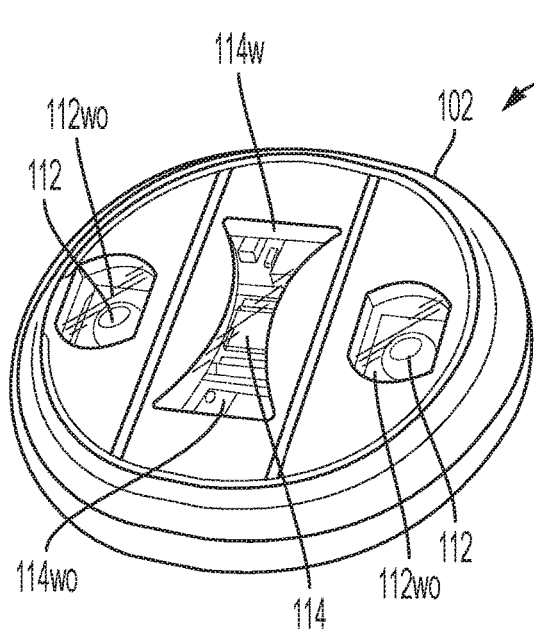
FIG. 4A is a perspective view of a PPG sensor module according to embodiments of the present invention and illustrating windows in the housing of the sensor module that expose the optical emitters and a window in the housing that exposes the optical detector.
Figure 4B:
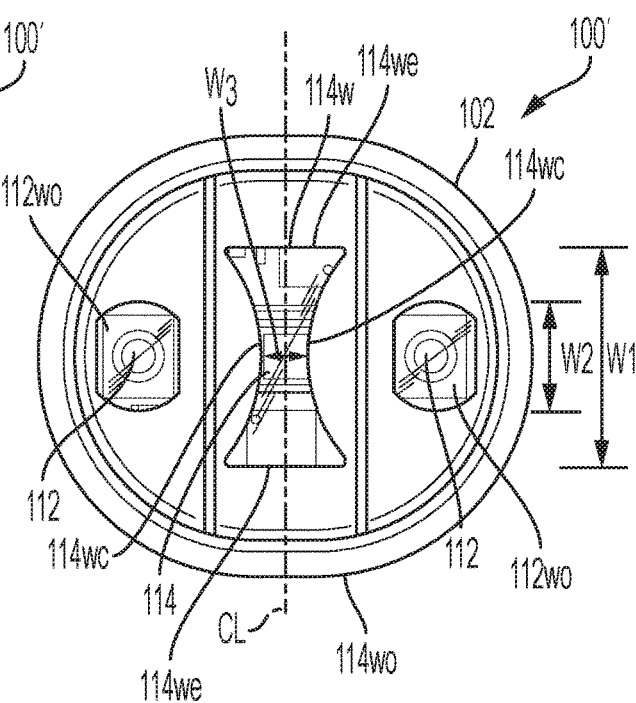
FIG. 4B is a plan view of the PPG sensor module of FIG. 4A.

FIGS. 3A-3B and 4A-4B illustrate PPG sensor module configurations according to some embodiments of the present invention. In FIGS. 3A-3B, a PPG sensor module 100 is illustrated that includes a housing 102 enclosing a pair of optical emitters 112 and an optical detector 114. The housing 102 includes a respective pair of windows 112w that expose the optical emitters 112 and a window 114w that exposes the optical detector 114. The windows 112w, 114w comprise optically transparent material 112wo, 114wo. The window 114w has a width $W_1$ that is greater than the width $W_2$ of each of the windows 112w overlying the optical emitters 112. In addition, the window 114w has an "hourglass" shaped configuration wherein the sides 114wc of the window 114w curve inwardly toward a centerline $C_L$ of the window 114w. In FIGS. 4A-4B, the window 114w has an hourglass shaped configuration, but the width $W_3$ of the window 114w at the medial portion is less than the width $W_4$ of the window 114w in FIGS. 3A-3B. In other words, the hourglass configuration of the window 114w in FIGS. 4A-4B is narrower than the window 114w in FIGS. 3A-3B.

In the various embodiments of the present invention illustrated and described herein, the optical emitters 112, 212, 312 may be one or more light-emitting diodes (LED), laser diodes (LD), compact incandescent bulbs, microplasma emitters, IR blackbody sources, organic LEDs (OLEDs), or the like, and may emit light at multiple wavelengths. In addition, in the various embodiments of the present invention illustrated and described herein, each optical emitter 112, 212, 312 may actually be multiple optical emitters. The optical detectors 114, 214, 314 may be one or more photodiodes, photodetectors, phototransistors, thyristors, solid state devices, optical chipsets, or the like.

In the various embodiments of the present invention illustrated and described herein, the optically transparent material 112wo, 114wo, 212wo, 214wo, 312wo, 314wo of which the various windows 112, 114, 212, 214, 312, 314 are formed may be polycarbonate, acrylic, glass, etc. Various type of material may be utilized, however. In some embodiments, the optically transparent material 112wo, 114wo, 212wo, 214wo, 312wo, 314wo may be transparent to selective wavelengths or bands of selected wavelengths. For example, an optical filter may be integrated within the material 112wo, 114wo, 212wo, 214wo, 312wo, 314wo. In some embodiments, the material 112wo, 114wo, 212wo, 214wo, 312wo, 314wo may be configured to allow only infrared light to pass therethrough.

Figure 5:
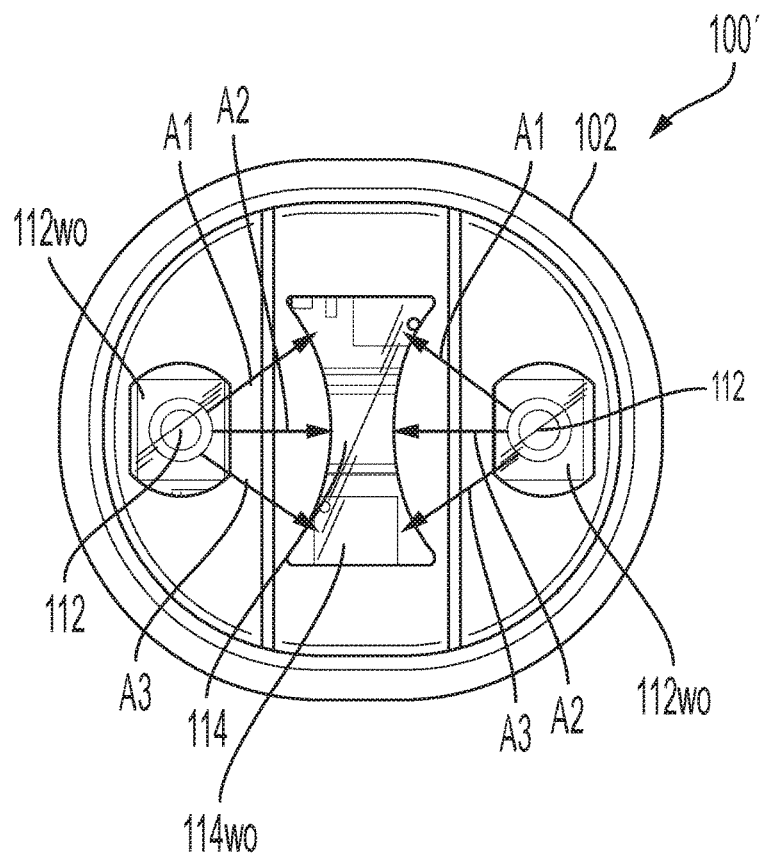
FIG. 5 is a plan view of the PPG sensor module of FIG. 4B illustrating optical pathways that can enter the window overlying the optical detector.

As with the elongated, rectangular configuration of the window 14w illustrated in FIGS. 1B-2B, the hourglass configuration of the window 114w in FIGS. 3A-3B and 4A-4B allows light from optical pathways $A_1$, $A_3$ (FIG. 5) interacting with a higher percentage of pulsatile blood to enter the optical detector 114 at the outer ends 114we of the window 114w. However, the elongated curved sides 114wc prevent light from shorter light pathways $A_2$ (FIG. 5), which have not interacted with a sufficient percentage of blood flow, from reaching the optical detector. Thus, the total optical energy reaching the optical detector 114 for the sensor module configurations of FIGS. 3A-3B and 4A-4B will comprise a higher percentage of modulation from pulsatile blood flow than the configurations of FIGS. 1A-1B and 2A-2B. Thus, the optical detector signals produced by the PPG sensor modules 100 and 100' of FIGS. 3A-3B and FIGS. 4A-4B, respectively, will have a higher signal-to-noise (S/N) ratio (i.e., a higher pulsatile "AC" blood flow signal with respect to DC optical levels, or a higher AC/DC) than the sensors 10, 20 illustrated in FIGS. 1A-1B and FIGS. 2A-2B.

The hourglass configurations of the windows 114w in the sensor modules 100, 100' of FIGS. 3A-3B and FIGS. 4A-4B, respectively, may be counterintuitive. Namely, even though the shorter optical pathways ($A_2$, FIG. 5) may have a lower percentage of pulsatile blood flow information than longer optical pathways ($A_1$, $A_3$, FIG. 5), the shorter pathways ($A_2$, FIG. 5) still contain a high amount of information about pulsatile blood flow. There may be a higher total AC signal from shorter optical pathways than longer pathways. Moreover, as it may be relatively straightforward to remove DC noise from pulsatile signals, collecting as much pulsatile (AC) light information as possible would naturally seem to be the best configuration, and so sensor configurations such as shown in FIGS. 1B and 2B would seem to be the natural choice. However, Applicant has determined that the hourglass shaped configuration of the window 114w of the sensor modules 100, 100' illustrated in FIGS. 3A-3B and 4A-4B are superior to the conventional sensor window configurations illustrated in FIGS. 1A-1B and 2A-2B.

Figure 1B:
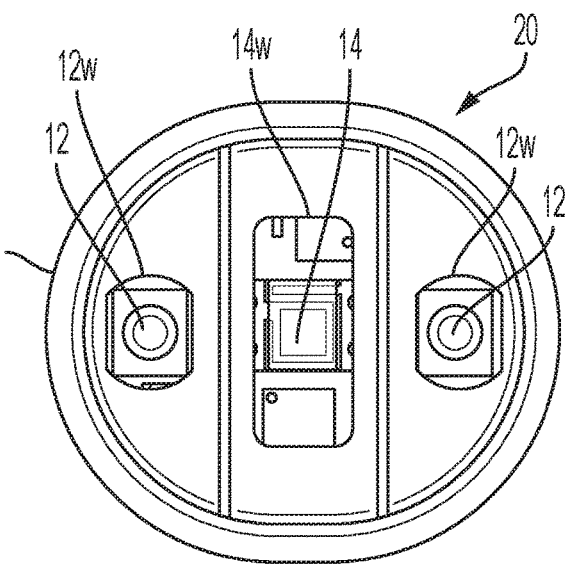
Figure 2A:
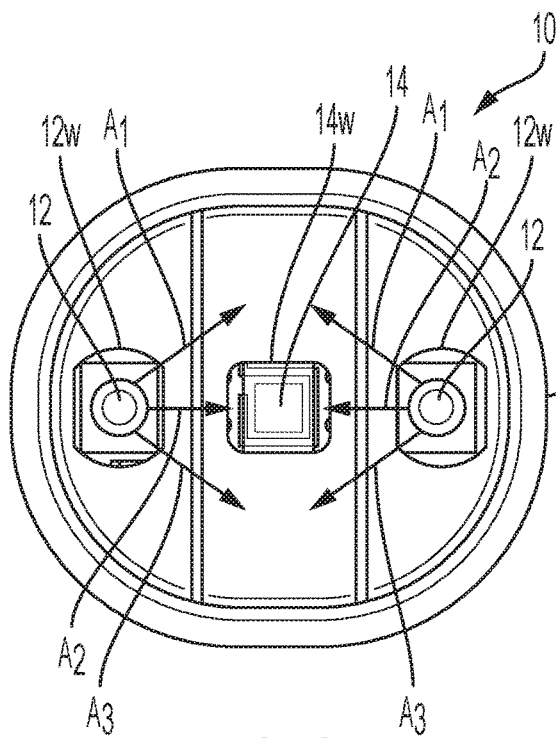
Figure 2B:
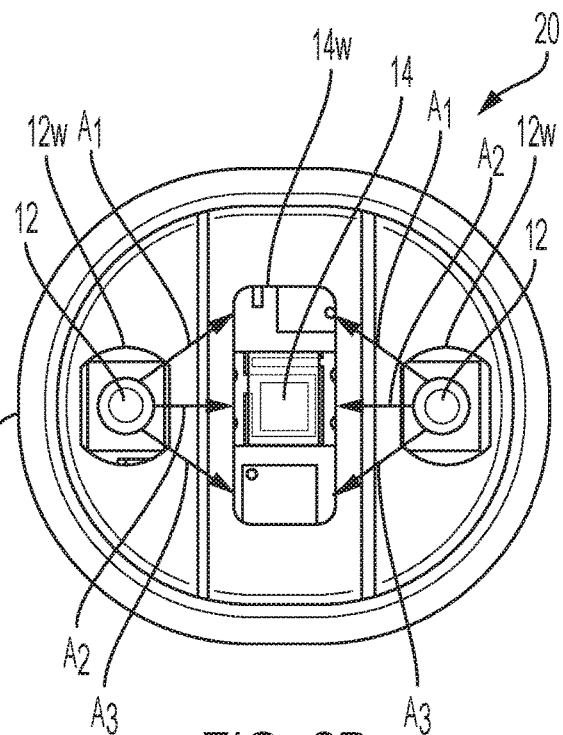
Figures 8B, 9A:
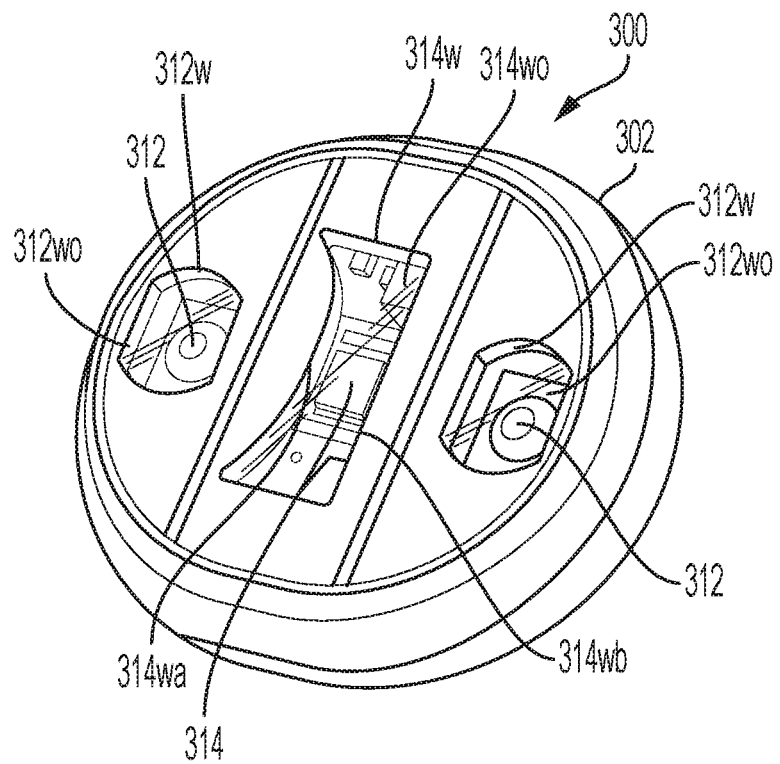

FIGS. 8A-8B summarize PPG data collected from the PPG sensor module 10 in FIG. 1A and the PPG sensor module 100 in FIGS. 3A-3B during a standard exercise testing protocol, comprising resting and exercising periods. For this testing protocol, a "pass" score (indicated by green) is given for each test that satisfies sufficient overall tracking of the PPG-based heart rate estimation in comparison to a high-quality ECG chest strap. In contrast, a "fail" score (indicated by red) is given for each test where the PPG-based heart rate estimation does not sufficiently track that of the ECG chest strap. For the testing results of FIGS. 8A-8B, the human participants were wearing two mock-up smartwatches, one on each wrist. These mock-up smartwatches were each weighted to be ~55 g and configured to be nearly identical, with the only difference being the optomechanical configuration of the PPG sensor module: one smartwatch had the conventional configuration of window 14w of FIG. 1A, and the other smartwatch had the configuration of window 114w of FIGS. 3A-3B, wherein the window 114w exposing the optical detector 114 has an hourglass configuration, referred to in FIGS. 8A-8B as "HW".

As shown in FIG. 8A, the smartwatch having the hourglass window configuration provided significantly better results, with a pass rate of 88%, in comparison to the pass rate of only 58% for the smartwatch with the conventional sensor window configuration. Insight into the nature of this performance improvement of the hourglass window configuration can be gleaned by comparing the "Figure-of-Merit" (FOM) for each window configuration of each of the passing tests to compare the signal qualities, which are set forth in FIG. 8B. The comparative FOM values, as presented for each test in FIG. 8B, were generated by ratioing the intensity of the pulsatile optical signals (the PPG signal) generated from heartbeats to the intensity optical signals due to motion artifacts. Examples of methods of analyzing signal quality for wearable PPG sensors are provided in U.S. Pat. No. 9,794,653, which is incorporated herein by reference in its entirety. When factoring all of the comparative tests together, both the median and average FOM were significantly higher for the smartwatch with the detector window with the hourglass configuration. This means that the hourglass configuration of window 114w of FIGS. 3A-3B is generally able to provide a higher amount of high-quality PPG signal (heartbeat-produced pulsatile signal) in comparison to motion artifact noise.

Moreover, it should be noted that the DC component of the PPG signal can become a prime source of motion noise during exercise. This is because this DC signal can periodically fluctuate with motion and thus falsely appear as pulsatile blood flow, ultimately reducing the accuracy of any derived PPG metrics—such as heart rate, breathing (respiration) rate, blood pressure, RRi, and the like. Thus, the higher AC/DC ratio that may be generated by the hourglass window configuration of the present invention is yet another factor which can additionally explain the improved performance of the sensor configuration illustrated in FIGS. 3A-3B and 4A-4B over the conventional detector window configuration of FIG. 1A.

It should be noted that the windows 114w in the sensor module configurations of FIGS. 3A-3B and 4A-4B may be produced directly, in some embodiments, by molding a sensor housing 102 to have hourglass-shaped windows. In other embodiments, windows 112, 114 may be affixed directly to corresponding openings in the housing 102. Embodiments of the present invention are not limited to any particular way of producing a housing with windows.

Figure 6:
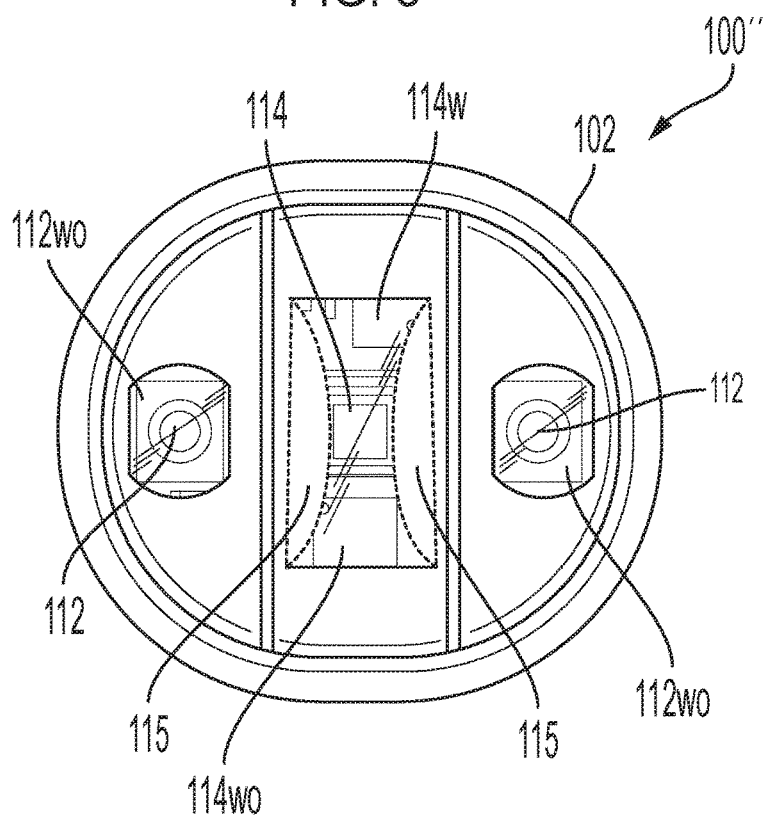
FIG. 6 is a plan view of a PPG sensor module according to embodiments of the present invention illustrating opaque material deposited on portions of the window overlying the optical detector.

In other embodiments, the higher S/N ratios may also be generated by depositing an opaque material or another light blocking structure 115 on a rectangular window, for example window 14w in FIGS. 1B and 2B, such that an hourglass shape is generated, as shown in FIG. 6. The opaque material 115 may include, but is not limited to, paint, plastic, metal, carbon, glass, or any reasonably robust material that can be deposited on or secured to an optical window. Such material 115 should be robust enough to survive a sufficient scratch test and to not be easily removed during normal wear throughout a variety of normal physical activities of the user (whether animal or human).

The opacity of the opaque material 115 need not be consistent throughout. For example, in some embodiments of the present invention, it may be beneficial to deposit opaque material 115 such that it is more opaque at the edges of the window 114w and less opaque towards the center of the window 114w. This way, preferential optical acceptance of photons through the window 114w (and then onward to the optical detector 114) is given for photons traveling through longer, more desirable optical pathways through physiological material.

Optical structures may also be located in and/or on the window 114w to provide preferential acceptance of light towards longer pathways. Nonlimiting examples of optical structures may include roughened surfaces, optical diffusion surfaces, optical reflection surfaces, mirror surfaces, microstructures, nanostructures, optical channels, metamaterials, warped surfaces, and the like. These structures should ideally be formed on solid substrates (i.e., the window material) that are largely optically transparent, such as glass, polycarbonate materials, transparent plastics, acrylic materials, or the like. A variety of materials for optics and lensing may serve as suitable substrates, as is well-known to those skilled in the art. These structures may be created, for example, by fabrication onto the windows (as with deposition or etching methodologies on top of a substrate), integration into the window during fabrication of the window, post-processing of the window (such as with thermal treatments or mechanical treatments to the substrate material), or the like.

In particular, it has been found that diffuse optical scatter at the emitter windows is correlated with reduced motion artifacts for the PPG signal. Namely, in one embodiment of the present invention, the emitter window optics comprised a polycarbonate material with a textured surface that generated a diffuse (as opposed to specular) optical reflection pattern. Thus, the optical emission pattern from the diffuse optical emitter window was diffuse, comprising evenly scattered light (as opposed to an image of the underlying optical emitter). It was found that a diffuse optical emission pattern improved the motion tolerance of the PPG-determined heart rate calculation during subject exercise testing.

Figure 7:
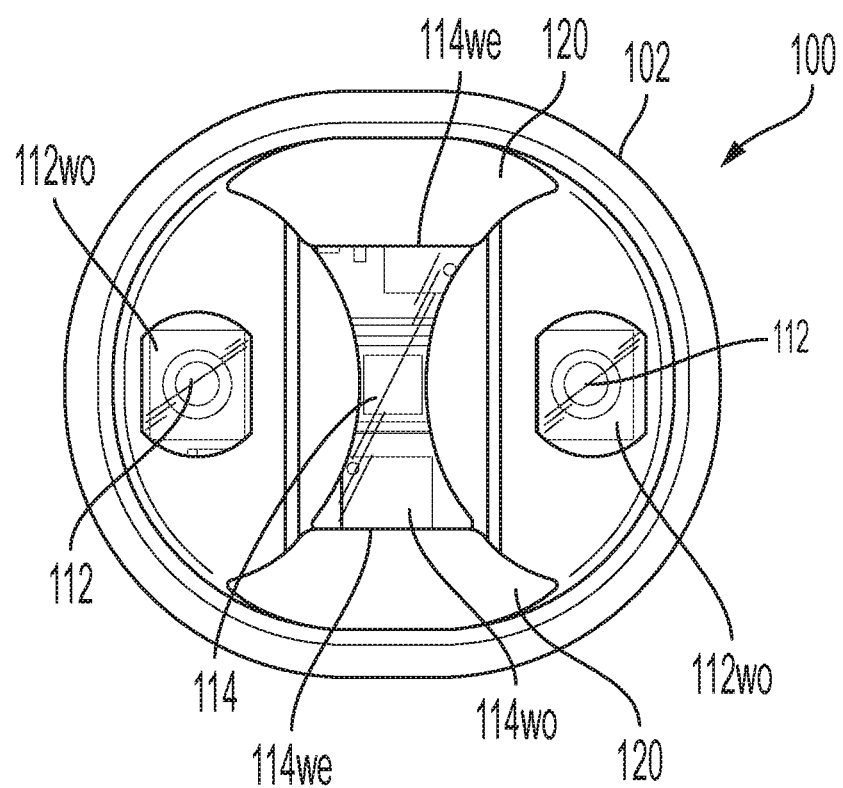
FIG. 7 is a plan view of a PPG sensor module according to embodiments of the present invention illustrating light guiding material located near the ends of the window overlying the optical detector.

According to some embodiments of the present invention, light guiding may be used to couple more light from desirable light paths into an hourglass shaped window. FIG. 7 illustrates light guiding material 120 configured to couple light into each end 114we of an hourglass shaped window 114w of a PPG sensor module 100. This can be beneficial because the longer the light pathway through physiological material, the greater the opportunity to interact with pulsatile blood, and thus the higher the potential S/N. But as noted earlier, the photon density through each pathway may be weak for long pathways, and thus collecting over a broader area may be important. The light guiding material 120 can be used to guide light from these regions to the optical detector 114 through the hourglass shaped window 114w.

Examples of light-guiding material 120 may include transparent materials having a higher index of refraction than air, or preferably having an index of refraction greater than 1.1. Nonlimiting examples of optical structures incorporated in the windows to improve light guiding may include roughened surfaces, optical diffusion surfaces, optical reflection surfaces, mirror surfaces, microstructures, nanostructures, optical channels, metamaterials, warped surfaces, and the like. In some embodiments, the light guiding material 120 may comprise transparent silicone, glass, or plastic, and the light guiding material may be raised with respect to the underlying window 114.

Figure 10:
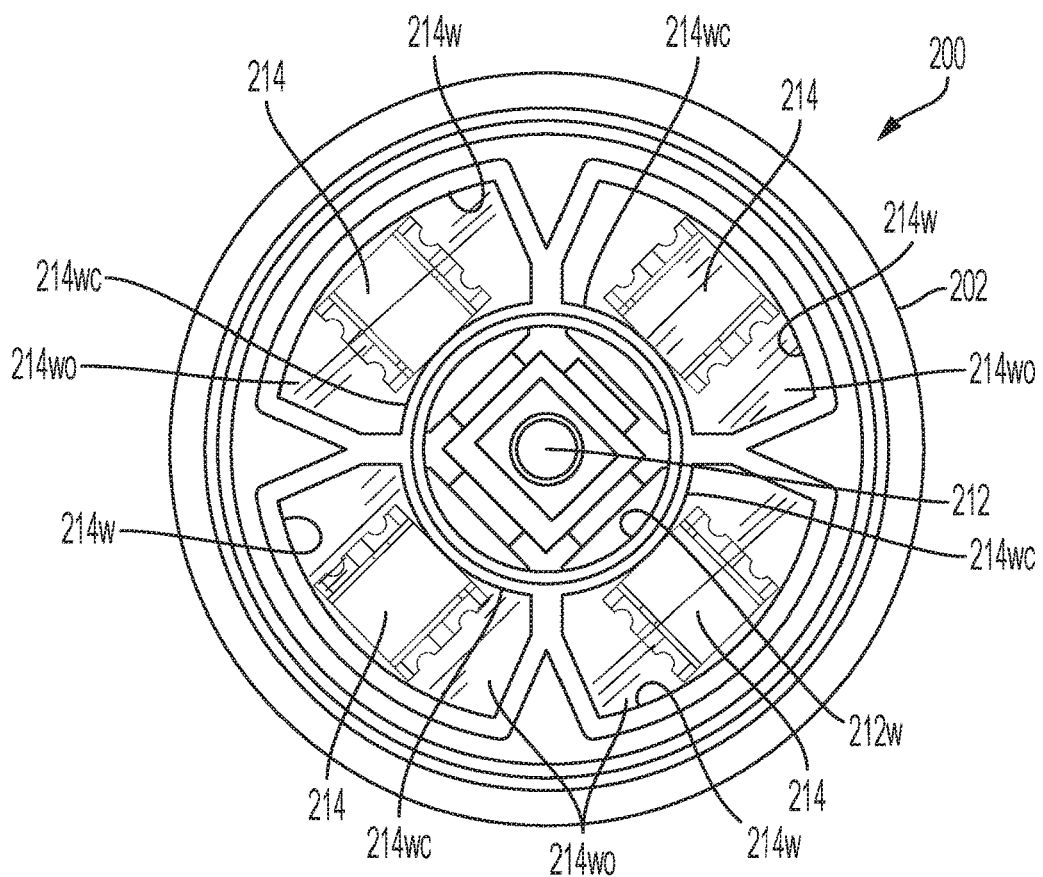
FIG. 10 is a plan view of a PPG sensor module according to embodiments of the present invention illustrating a central optical emitter and a plurality of optical detectors positioned radially outwardly from the optical emitter.

Although the embodiments of FIGS. 3A-3B and 4A-4B include two optical emitters 112 and one optical detector 114, other embodiments of the present invention are not limited to this configuration. Any number of emitters 112 and detectors 114 may be used. For example, FIG. 10 illustrates an optical configuration for a wearable PPG sensor module 200 having a housing 202 and one central emitter 212 and four optical detectors 214 within the housing 202. A window 212w of optically transparent material overlies the optical emitter 212, and a respective plurality of arcuate windows 214w of optically transparent material 214wo are positioned radially outwardly from the first window, with each arcuate window 214w overlying a respective one of the optical detectors 214. The plurality of arcuate windows 214w are positioned around the first window in an end-to-end relationship. Each of the arcuate windows 214w has a side 214wc adjacent the emitter window 212w that is curved outwardly away from the emitter window 212w. The optical detector windows 214w have an arcuate shape with a radius of curvature that prevents light from unwanted optical pathways from coupling with a respective optical detector beneath the windows 214*w*.

Although the optical detector windows 214*w* in this configuration are not hourglass shaped, the radius of curvature with respect to the optical emitter 212 is the same configuration as the hourglass configuration of windows 114*w* in FIGS. 3A-3B and 4A-4B. In other words, each window 214*w* is configured to accept longer optical pathways and to reject shorter optical pathways in a radial direction with respect to the optical emitter 212.

Although the hourglass shape of an optical detector window configuration improves the S/N ratio for a wearable PPG sensor module, it also may reduce the total amount of light entering the window. Thus, the total optical signal may be lower, and this may negatively impact PPG signal processing of biometrics that require fine resolution of the PPG waveform, such as is the case with using PPG waveforms to estimate blood pressure. For this reason, it may be beneficial to have an optical detector window 314*w* with a configuration as illustrated in FIGS. 9A-9B.

Figure 9B:
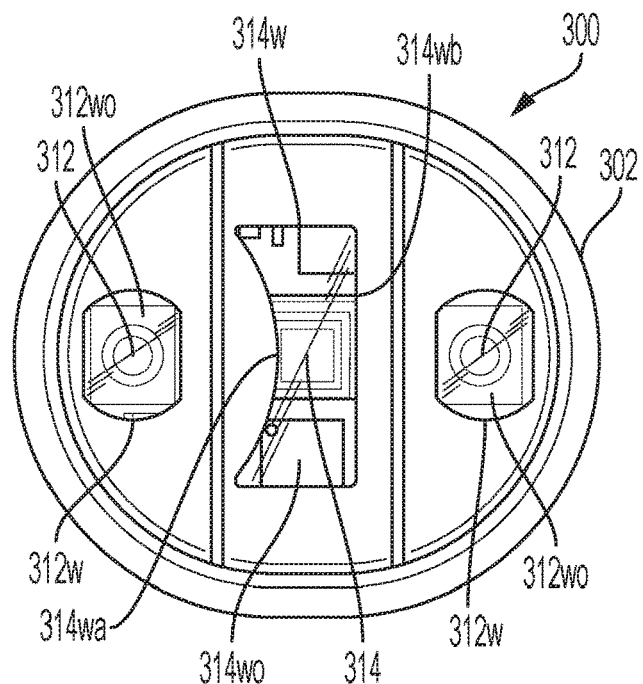
FIG. 9B is a plan view of the PPG sensor module of FIG. 9A.

In FIGS. 9A-9B, a PPG sensor module 300 is illustrated that includes a housing 302 enclosing a pair of optical emitters 312 and an optical detector 314. The housing 302 includes a respective pair of windows 312*w* of optically transparent material 312*wo* that expose the optical emitters 312 and a window 314*w* of optically transparent material 314*wo* that exposes the optical detector 314. Only one elongated side 314*wa* of the window 314*w* is curved. The other elongated side 314*wb* is substantially straight. In this configuration, the emitter 312 facing the curved side 314*wa* of the detector window 314*w* may be most useful for obtaining PPG measurements during motion (such as with the case of measuring heart rate during exercise) and the other emitter 312 facing the straight side 314*wb* of the detector window 314*w* may be most useful for PPG measurements taken at rest (such as with estimating blood pressure at rest, where high-quality PPG waveforms are desired). By biasing the emitters 312 alternately in time (i.e., one on, the other on, or both on), the most desirable optical pathways can be assessed by the optical detector 314 depending on the desired use case for PPG monitoring.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

That which is claimed is:

1. An optical sensor module, comprising:
   a housing;
   first and second optical emitters within the housing; and
   an optical detector within the housing and positioned between the first and second optical emitters;
   wherein:
   the housing comprises respective first and second windows of optically transparent material overlying the first and second optical emitters, and a third window of optically transparent material overlying the optical detector;
   the third window is defined by opposite first and second ends and opposite first and second sides different from each the first end and the second end; at least one of the first and second sides are curved inwardly towards a centerline of the third window;
   an opaque material overlies portions of at least one of the first and second sides such that the least one of the first and second sides curve inwardly towards the centerline of the third window; and
   the opaque material has a greater opacity adjacent to the first and second sides and a decreasing opacity in a direction away from at least one of the first and second sides.

2. The optical sensor module of claim 1, wherein the third window has an hourglass shape.

3. The optical sensor module of claim 1, further comprising light guiding material located adjacent at least one of the first and second ends of the third window.

4. The optical sensor module of claim 1, wherein the optical sensor module is a photoplethysmography (PPG) sensor module.

5. An optical sensor module, comprising:
   a housing;
   first and second optical emitters within the housing; and
   an optical detector within the housing and positioned between the first and second optical emitters;
   wherein:
   the housing comprises respective first and second emitters, and a third window of optically transparent material overlying the optical detector;
   the third window has an elongated rectangular shape with opposite first and second ends and opposite first and second sides different from each the first and second ends;
   an opaque material overlies portions of the first and second sides of the third window such that the third window has an hourglass shaped optically transparent configuration;
   the opaque material has a greater opacity adjacent the first and second sides of the third window; and
   the opacity of the opaque material decreases in a direction away from each of the first and second sides of the third window.

6. The optical sensor module of claim 5, wherein the opaque material comprises paint, plastic, metal, carbon, or glass.

7. The optical sensor module of claim 5, further comprising light guiding material located adjacent at least one of the first and second ends of the third window.

8. The optical sensor module of claim 5, wherein the optical sensor module is a photoplethysmography (PPG) sensor module.

9. An optical sensor module, comprising:
   a housing;
   first and second optical emitters within the housing; and
   an optical detector within the housing and positioned between the first and second optical emitters;
   wherein:
   the housing comprises respective first and second windows of optically transparent material overlying the first and second optical emitters, and a third window of optically transparent material overlying the optical detector;
   the third window has an elongated rectangular shape with opposite first and second ends and opposite first and second sides different from the first and second ends;
   an opaque material overlies a portion of at least one of the first and second sides of the third window such that the at least one of the first and second sides of the third window effectively curves inwardly towards a centerline of the third window;

the opaque material has a greater opacity adjacent the one of the first and second sides; and the opacity of the opaque material decreases in a direction away from the one of the first and second sides.

10. The optical sensor module of claim 9, wherein the opaque material comprises paint, plastic, metal, carbon, or glass.

11. The optical sensor module of claim 9, further comprising light guiding material located adjacent at least one of the first and second ends of the third window.

12. The optical sensor module of claim 9, wherein the optical sensor module is a photoplethysmography (PPG) sensor module.

* * * * *